(12) United States Patent
Chartier et al.

(10) Patent No.: US 7,716,574 B2
(45) Date of Patent: May 11, 2010

(54) METHODS AND SYSTEMS FOR PROVIDING DIRECT STYLE SHEET EDITING

(75) Inventors: Daniel P. Chartier, Redmond, WA (US); Benjamin C. Constable, Redmond, WA (US); Sam Spencer, Redmond, WA (US); Hessan Tchaitchian, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 11/223,397

(22) Filed: Sep. 9, 2005

(65) Prior Publication Data

US 2007/0061710 A1    Mar. 15, 2007

(51) Int. Cl.
G06F 17/20 (2006.01)
(52) U.S. Cl. .................. 715/235; 715/234
(58) Field of Classification Search .......... 715/235
See application file for complete search history.

(56) References Cited

U.S. PATENT DOCUMENTS

| | | | | |
|---|---|---|---|---|
| 5,487,141 | A * | 1/1996 | Cain et al. ............. | 715/764 |
| 5,860,073 | A | 1/1999 | Ferrel et al. | |
| 7,051,276 | B1 | 5/2006 | Mogilevsky et al. ...... | 715/517 |
| 7,111,234 | B2 | 9/2006 | Peck et al. ............ | 715/517 |
| 7,131,065 | B1 | 10/2006 | Kane .................. | 715/517 |
| 7,337,393 | B2 | 2/2008 | Chartier et al. ......... | 715/513 |
| 7,383,498 | B1 * | 6/2008 | Hickl et al. ............ | 715/235 |
| 2002/0188636 | A1 | 12/2002 | Peck et al. | |
| 2003/0182627 | A1 * | 9/2003 | Chung et al. ........... | 715/513 |
| 2004/0187080 | A1 | 9/2004 | Brooke et al. | |
| 2004/0205588 | A1 | 10/2004 | Purvis et al. ........... | 715/513 |
| 2004/0255244 | A1 | 12/2004 | Filner et al. ............ | 715/517 |
| 2005/0138540 | A1 * | 6/2005 | Baltus et al. ........... | 715/511 |
| 2005/0251742 | A1 | 11/2005 | Mogilevsky et al. ...... | 715/521 |
| 2005/0256965 | A1 * | 11/2005 | Hohmann et al. ........ | 709/230 |
| 2006/0136813 | A1 * | 6/2006 | Hong et al. ............ | 715/512 |
| 2006/0212803 | A1 | 9/2006 | Arokiaswamy .......... | 715/520 |
| 2006/0218490 | A1 * | 9/2006 | Fink .................. | 715/517 |
| 2006/0259859 | A1 | 11/2006 | Ivarsoy et al. .......... | 715/520 |

FOREIGN PATENT DOCUMENTS

EP    1 100 269 A1    5/2001

OTHER PUBLICATIONS

U.S. Office Action dated Dec. 13, 2006 cited in U.S. Appl. No. 11/222,715.

(Continued)

*Primary Examiner*—Doug Hutton
*Assistant Examiner*—Tionna Smith
(74) *Attorney, Agent, or Firm*—Merchant & Gould

(57) ABSTRACT

Systems and methods are disclosed for providing direct style sheet editing. The disclosed systems and methods may include selecting a first target rule for a next formatting operation. The selected first target rule may include a modified property and may be selected from a plurality of target rules. Furthermore, the disclosed systems and methods may include enabling property changes to occur in a most specific target rule in the plurality of target rules. The most specific target rule may contain the modified property. Moreover, the disclosed systems and methods may include providing a highlighting mechanism configured to allow a user to see which regions of a page are to be affected by the selected first target rule.

14 Claims, 5 Drawing Sheets

OTHER PUBLICATIONS

Joseph W. Lowery, "Dreamweaver MX 2004 Bible," 2004, Wiley Publishing, Inc., pp. 415-427, 436-438.

PCT Search Report dated Feb. 22, 2007 cited in Application No. PCT/US2006/034992.

Co-pending U.S. Appl. No. 11/222,715, entitled "Methods and Systems for Providing an Editable Visual Formatting Model," filed Sep. 9, 2005.

U.S. Final Office Action dated May 1, 2007 cited in U.S. Appl. No. 11/222,715.

Budd, "Andy Budd on CSS Margin Collapsing," URL: http://www.handcoding.com/archives/2004/02/14/andy-budd-on-css-margin-collapsing, Feb. 14, 2004.

Meyer, "CSS—Auto/height and margin-collapsing". URL: http://www.researchkitchen.de/blog/archives/css-autoheight-and-margincollapsing.php. Jul. 28, 2004.

Chinese First Office Action dated Jun. 19, 2009 cited in Application No. 200680033033.X.

* cited by examiner

METHODS AND SYSTEMS FOR PROVIDING DIRECT STYLE SHEET EDITING

RELATED APPLICATION

Related U.S. patent application Ser. No. 11/222,715, filed on even date herewith in the name of Daniel P. Chartier et al. and entitled "METHODS AND SYSTEMS FOR PROVIDING AN EDITABLE VISUAL FORMATTING MODEL," assigned to the assignee of the present application, is hereby incorporated by reference.

BACKGROUND

A style sheet is a master page layout used in document creation systems such as word processing, desktop publishing, and the Internet. The style sheet is a file that is used to store margins, tabs, fonts, headers, footers, and other layout settings for a particular category of document. When a style sheet is selected, its format settings are applied to all the documents created under it, saving the page designer or programmer from redefining the same settings over and over again for each page.

Cascading style sheets (CSS) defines a visual formatting model used for laying out, for example, extensible markup language (XML) or hypertext markup language (HTML) elements. In this model, every element is laid out using a visual "box model." As shown in FIG. 4, a box model 400 includes a plurality of boxed elements comprising a margin 405, a border 410, a padding 415, and a content 420 that together allow the flexible layout of the boxed elements. Moreover, every edge for each boxed element in box model 400 is given a CSS property (e.g. "margin-left" or "padding-top".) For example, using box model 400, a paragraph can be indented by giving it a left margin.

Another aspect of the visual formatting model are the CSS position schemes that define a set of positioning modes that use the offsets "top", "right", "bottom", "left", "width" and "height" to position boxed elements on a page. Using one of the positioning schemes, such as "absolute", a boxed element can be position at the very top-left of the positioning container using "top: 0; left: 0;", for example.

In some situations, editing box model properties is limited to manual code editing or form user interface (UI.) Thus, the conventional strategy is to directly edit the associated CSS box model properties. This often causes problems because the conventional strategy requires a manual non-visual process. For example, the conventional strategy forces designers to tediously edit the page layout in one UI and then switch to a preview mode to observe the edit's effect.

In view of the foregoing, there is a need for methods and systems for providing direct style sheet editing more optimally. Furthermore, there is a need for providing direct style sheet editing using, for example, a style application toolbar.

SUMMARY

Consistent with embodiments of the present invention, systems and methods are disclosed for providing direct style sheet editing.

In accordance with one embodiment, a method for providing direct style sheet editing comprises selecting a first target rule for a next formatting operation, the selected first target rule including a modified property and being selected from a plurality of target rules and enabling property changes to occur in a most specific target rule in the plurality of target rules, the most specific target rule containing the modified property.

According to another embodiment, a system for providing direct style sheet editing comprises a memory storage for maintaining a database and a processing unit coupled to the memory storage, wherein the processing unit is operative to select a first target rule for a next formatting operation, the selected first target rule including a modified property and being selected from a plurality of target rules, enable property changes to occur in a most specific target rule in the plurality of target rules, the most specific target rule containing the modified property, and provide a highlighting mechanism configured to allow a user to see which regions of a page are to be affected by the selected first target rule.

In accordance with yet another embodiment, a computer-readable medium which stores a set of instructions which when executed performs a method for providing direct style sheet editing, the method executed by the set of instructions comprising selecting a first target rule for a next formatting operation, the selected first target rule including a modified property and being selected from a plurality of target rules and enabling property changes to occur in a most specific target rule in the plurality of target rules, the most specific target rule containing the modified property.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
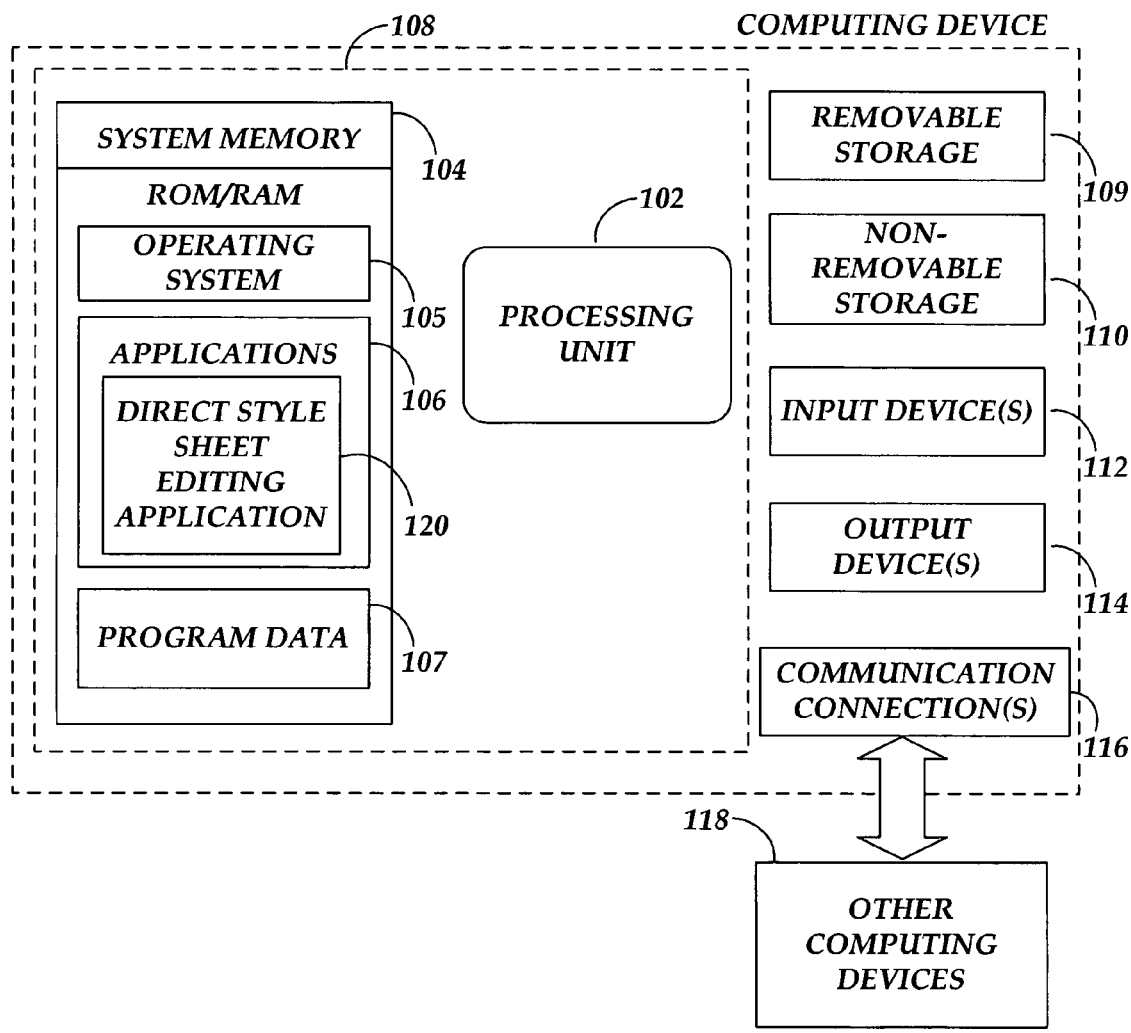
FIG. 1 is a block diagram of an exemplary system including a computing device consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention provide direct style sheet editing. Consistent with embodiments of the present invention, direct style sheet editing is provided using, for example, a style application toolbar in a "what you see is what you get" (WYSIWYG) design view environment. Direct style sheet editing consistent with embodiments of the invention may use CSS, though the invention is not limited to CSS and other formatting models may be used. WYSIWYG, for example, refers to displaying text and graphics on a screen in the same way the text and graphics print. To have WYSIWYG text, there may be an equivalent screen font for each printer font used.

Conventionally, WYSIWYG HTML editors were limited to editing, for example, CSS through either inline styles or through hard coded rules for the creation, re-use, and destruction of CSS classes. The only way to modify sophisticated CSS using conventional processes was through hand coding and/or manual entry property editing. Consistent with embodiments of the present invention, with direct WYSIWYG CSS editing, users may have near hand coding control with the convenience of design view editing, including, for example, immediate WYSIWYG feedback, formatting toolbars, and dialogs, and design view editing tools.

Figure 2A:
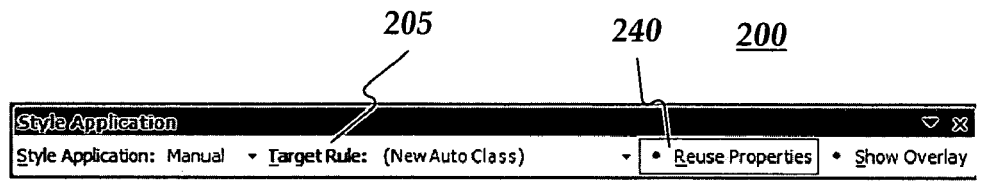
FIGS. 2A and 2B are screen shots illustrating a style application toolbar consistent with an embodiment of the present invention.
Figure 2B:
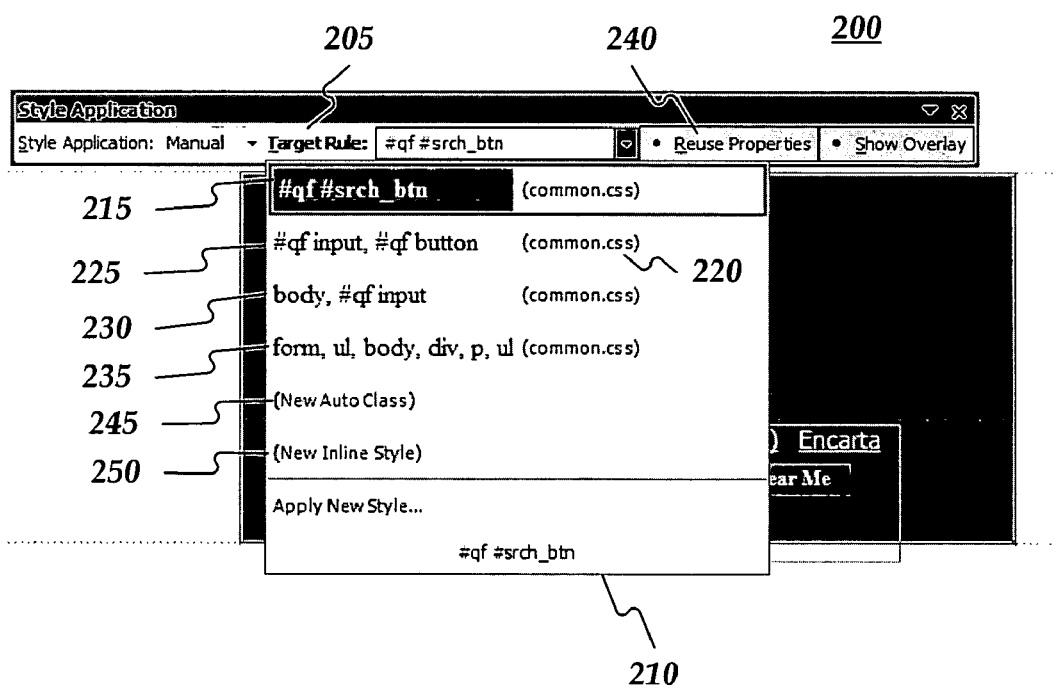
Figure 2C:
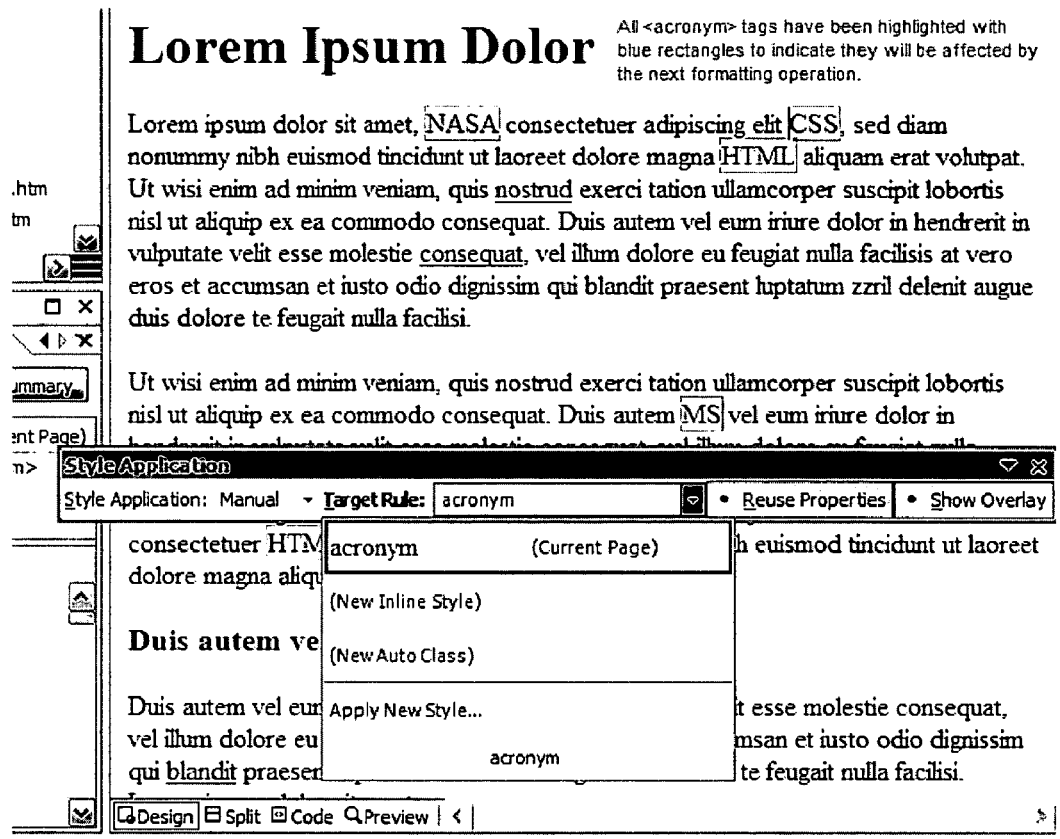
FIG. 2C is a screen shot illustrating a highlighting mechanism consistent with an embodiment of the present invention.

As shown in FIGS. 2A and 2B, consistent with embodiments of the present invention, direct WYSIWYG CSS editing may be achieved, for example, through a style application toolbar 200. Style application toolbar 200 may allow a user to select, for example, a target CSS rule that the next formatting operation should operate on. In addition, style application toolbar 200 may also allow the user to enable property changes to occur on the most specific rule already containing a modified property. This may allow the toolbar to work efficiently against most cascades. Furthermore, as illustrated by FIG. 2C, consistent with embodiments of the present invention, a highlighting mechanism 260 may be used that may allow the user to see which regions of the page will be affected by the currently selected CSS rule (e.g. if the selected rule is the selector "p" all paragraphs would be selected).

An embodiment consistent with the invention may comprise a system for providing direct style sheet editing. The system may comprise a memory storage for maintaining a database and a processing unit coupled to the memory storage. The processing unit may be operative to select a first target rule for a next formatting operation, the selected first target rule including a modified property and being selected from a plurality of target rules. In addition, the processing unit may be operative to enable property changes to occur in a most specific target rule in the plurality of target rules, the most specific target rule containing the modified property. Moreover, the processing unit may be operative to provide a highlighting mechanism configured to allow a user to see which regions of a page are to be affected by the selected first target rule.

Consistent with an embodiment of the present invention, the aforementioned memory, processing unit, and other components may be implemented in a computing device, such as an exemplary computing device 100 of FIG. 1. Any suitable combination of hardware, software, and/or firmware may be used to implement the memory, processing unit, or other components. By way of example, the memory, processing unit, or other components may be implemented with any of computing device 100 or any of other computing devices 118, in combination with computing device 100. The aforementioned system, device, and processors are exemplary and other systems, devices, and processors may comprise the aforementioned memory, processing unit, or other components, consistent with embodiments of the present invention.

Generally, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system consistent with an embodiment of the invention may include a computing device, such as computing device 100. In a basic configuration, computing device 100 may include at least one processing unit 102 and a system memory 104. Depending on the configuration and type of computing device, system memory 104 may be volatile (such as RAM), non-volatile (such as ROM, flash memory, etc.) or some combination. System memory 104 may include an operating system 105, one or more applications 106, and may include a program data 107. In one embodiment, applications 106 may include a direct style sheet editing application 120. However, embodiments of the invention may be practiced in conjunction with a graphics library, an operating system, a desktop publishing application, or any application program and is not limited to any particular application or system. This basic configuration is illustrated in FIG. 1 by those components within a dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. The aforementioned devices are exemplary and others may be used.

Computing device 100 may also contain a communication connection 116 that may allow device 100 to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein may include both storage media and communication media.

A number of program modules and data files may be stored in system memory 104 of computing device 100, including an operating system 105 suitable for controlling the operation of a networked personal computer, such as the WINDOWS operating systems from MICROSOFT CORPORATION of Redmond, Washington. System memory 104 may also store one or more program modules, such as direct style sheet editing application 120, and others described below. While executing on processing unit 102, direct style sheet editing application 120 may perform processes including, for example, one or more of the stages of the methods described below. The aforementioned process is exemplary, and processing unit 102 may perform other processes. Other applications 106 that may be used in accordance with embodiments of the present invention may include electronic mail and contacts applications, word processing applications, spreadsheet applications, database applications, slide presentation applications, drawing or computer-aided application programs, a desktop publishing application, etc.

Figure 3:
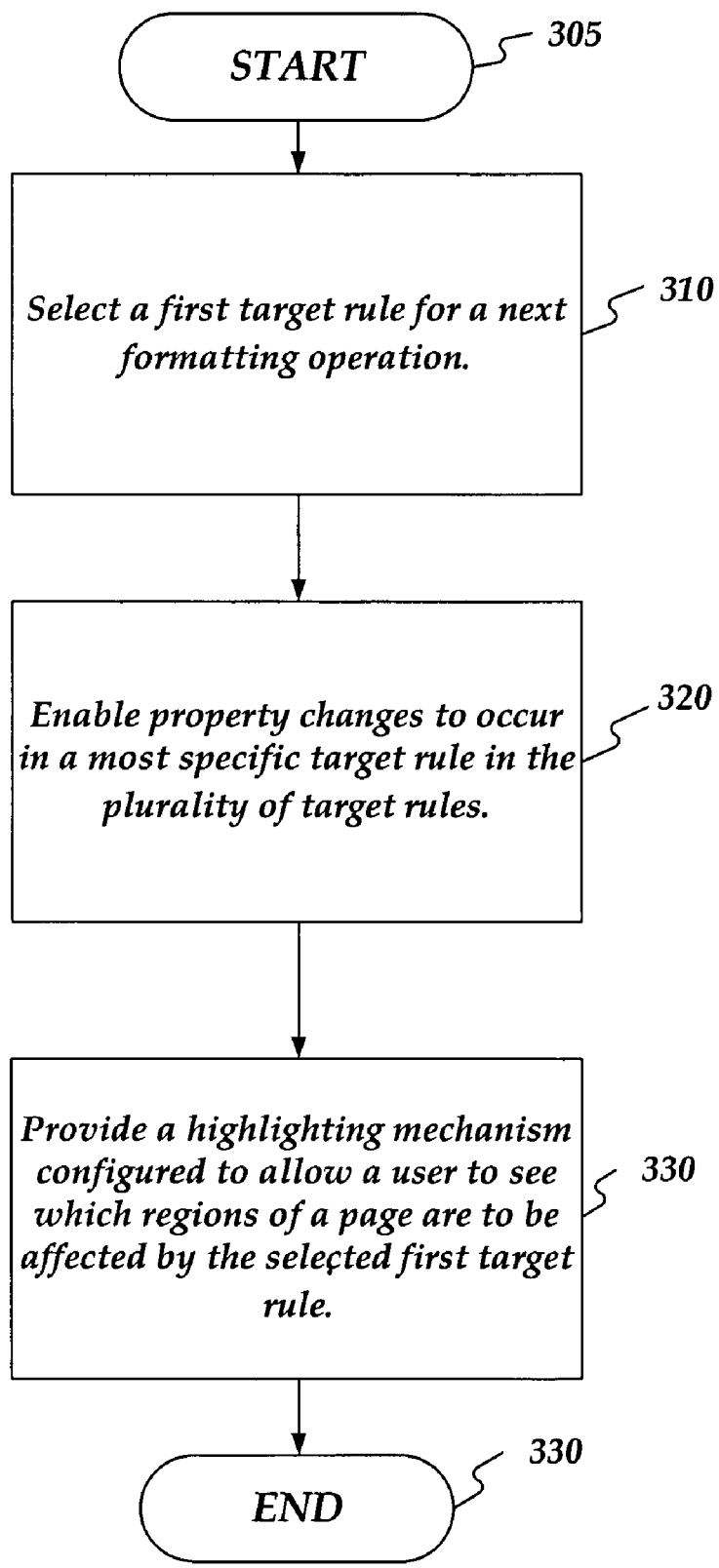
FIG. 3 is a flow chart of an exemplary method for providing direct style sheet editing consistent with an embodiment of the present invention.
Figure 4:
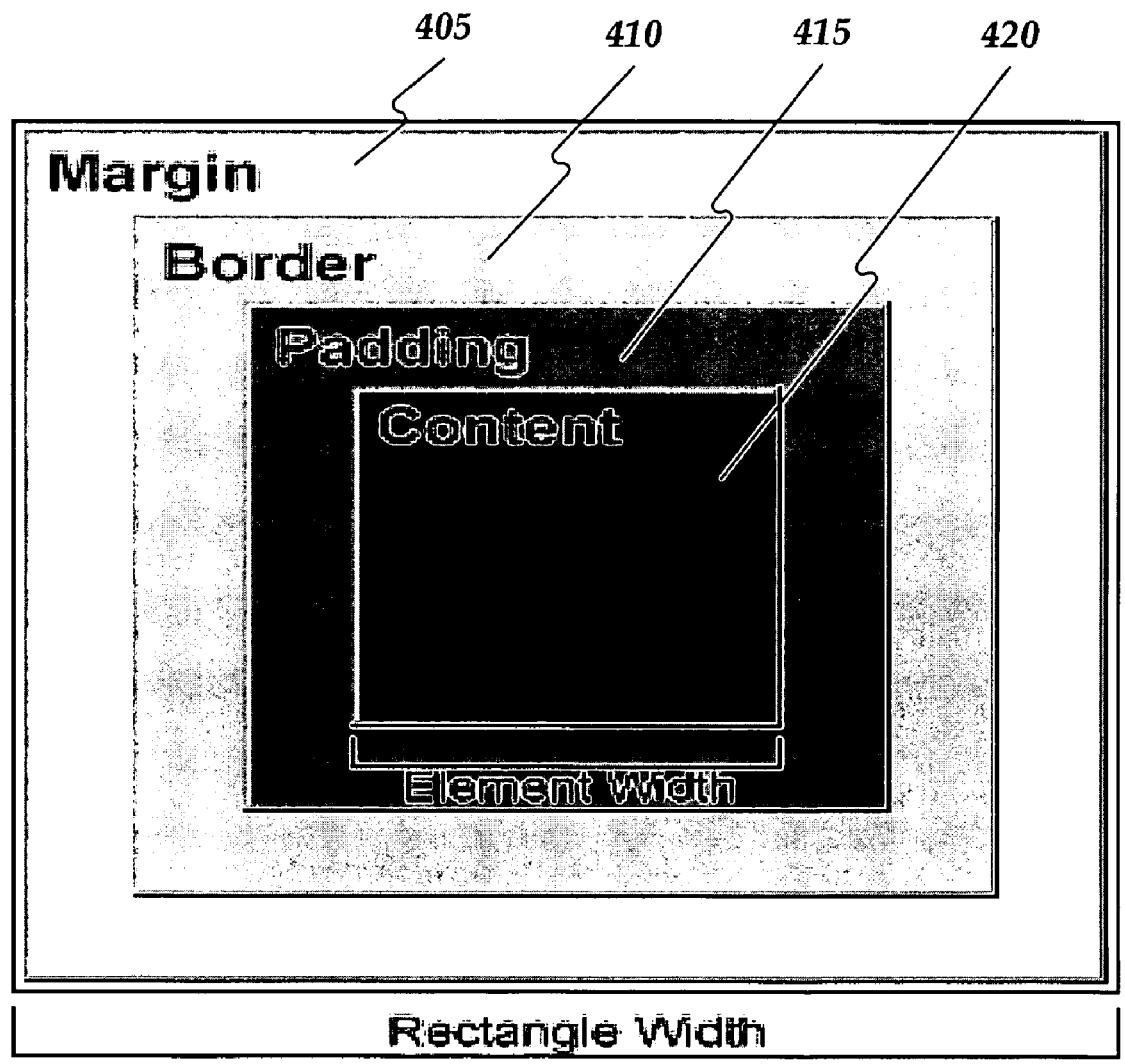
FIG. 4 is a diagram illustrating a box model.

FIG. 3 is a flow chart setting forth the general stages involved in an exemplary method 300 consistent with the invention for providing direct style sheet editing using computing device 100 of FIG. 1. Exemplary ways to implement the stages of exemplary method 300 will be described in greater detail below. Exemplary method 300 may begin at starting block 305 and proceed to stage 310 where direct style sheet editing application 120 may cause computing device 100 to select a first target rule for a next formatting operation. The selected first target rule may include a modified property and may be selected from a plurality of target rules. For example, as shown in FIGS. 2A and 2B, direct WYSIWYG CSS editing may be achieved through style application toolbar 200. Style application toolbar 200 may allow a user to select, for example, a target CSS rule (e.g. the first target rule) the next formatting operation should operate on. The user may use one of input devices 112 (e.g. a mouse) to select a target rule button 205 from style application toolbar 200 displayed on one of output devices 114. Once target rule button 205 is selected, a drop down menu 210 is displayed. Drop down menu 210 may display all the possible target CSS rules (e.g. the plurality of tangent rules) the user has to choose from. For example, as shown in FIG. 2B, the target CSS rule may comprise an entire selector list plus a declaration blocking. Moreover, consistent with embodiments of the invention, the target CSS rule may comprise, but is not limited to, a CSS rule, an in-line style, auto classing, and semantic auto IDing.

Some applications may include editing HTML documents with existing style sheets (i.e. for the currently selected HTML element, there may be one or more CSS selectors applying to that element.) Notwithstanding, there may be no guarantee that there will be any selectors applied to the current selection. Editing, however, may still be needed. In this case, a new CSS rule or inline style to apply, for example, CSS may be created. Consequently, "semantic" auto-rules (including semantic auto Iding) may refer to generating a new CSS rule selector based on an existing tag and CLASS and ID attribute values for a currently selection HTML element. For example, for the following HTML, <p class="Copyright">Copyright 2005 Microsoft Corp.</p>, with no CSS selectors applied to that element, embodiments of the present invention may create a new CSS rule based on the element's semantics. Given the above HTML example, it may be "p.Copyright", because the HTMP includes a <p>element with a class of "Copyright".

The above is a class based semantic auto-rule example. Semantic auto IDing may also be done with ID's. Given the following HTML, <h3 id="Title">Daily Microsoft News</h3>, embodiments of the present invention may create a new CSS rule using the selector "h3#Title". Accordingly, semantic auto-rule creation (including semantic auto Iding) may simplify the HTML document styling process not already, for example, styled with CSS.

As stated above, style application toolbar 200 may allow a user to select the target CSS rule the next formatting operation should operate on. For example, while running one of application programs 106 (e.g. a desktop publishing application), the user may select a target CSS rule button 215 from menu 210 to change, for example, the default color to blue. Consistent with embodiments of the invention, direct style sheet application 120 may make that color change in the selected target rule (i.e. a modified property.) For example, as shown in FIG. 2B, in the file "common.CSS" 220, direct style sheet application 120 may edit the rule defined by selected target CSS rule button 215. Accordingly, any subsequent operation may affect that rule. For example, if the user executed a resize operation, the selected rule may change accordingly. Likewise, if the user changed the margin, the selected rule may change accordingly. In other words, by making the selection using tool bar 200 as described above, in any subsequent formatting operations from then on, an editor may be informed where the user wants that particular formatting operation for CSS editing to occur.

From stage 310, where computing device 100 selects the first target rule for the next formatting operation, exemplary method 300 may advance to stage 320 where direct style sheet editing application 120 may cause computing device 100 to enable property changes to occur in a most specific target rule in the plurality of target rules. The most specific target rule may contain the modified property. For example, style application toolbar 200 may also allow the user to enable property changes to occur on the most specific rule already containing the modified property. This may allow the toolbar to work efficiently against most cascades. For example, as shown in FIG. 2B, menu 210 lists several target CSS rules 215, 225, 230, and 235 (e.g. the plurality of target rules.) All four target CSS rules 215, 225, 230, and 235 may apply to the current application (e.g. a desktop publishing application) and all four may have different CSS defined. For example, target CSS rule 215 may give the application a green background image. The other three target rules 225, 230, and 235 may apply to other attributes (e.g. margins.) Now, in target CSS rule 215, the user may change the color from green to red. However, the color may not be currently set with target CSS rule 215, but with one of the other three target CSS rules 225, 230, and 235.

Consistent with embodiments of the invention, when a re-used properties button 240 is selected, for example, direct style sheet application 120 may analyze the other three target CSS rules 225, 230, and 235. This analysis may occur in target CSS rules' 225, 230, and 235 order of specificity to see if any of those target CSS rules set color already. And if so, this analysis may set it there (e.g. one of three target CSS rules 225, 230, and 235) rather than the currently selected target CSS rule (e.g. target CSS rule 215.) Without direct style sheet application 120 performing this analysis, the user would need to remember which one of the target CSS rules had set the color originally. In other words, direct style sheet application 120 may determine, for example, where the color was set already.

Once computing device 100 enables property changes to occur in the most specific target rule in stage 320, exemplary method 300 may advance to stage 330 where direct style sheet editing application 120 may cause computing device 100 to provide a highlighting mechanism configured to allow a user to see which regions of a page are to be affected by the selected first target rule. For example, as illustrated by FIG. 2C, consistent with embodiments of the present invention, a highlighting mechanism 260 may be used that may allow the user to see which regions of the page will be affected by the currently selected CSS rule. For example, if the selected rule is the selector "p", all paragraphs would be selected. After computing device 100 provides the highlighting mechanism in stage 330, exemplary method may then end at stage 340.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for providing direct style sheet editing via a tool bar, the method comprising:
    selecting a first target cascading style sheets (CSS) rule for a next formatting operation, the selected first target CSS rule including a modified property and being selected from a plurality of target CSS rules;
    determining if the modified property was previously set by one of the plurality of target CSS rules, wherein the target CSS rule that previously set the modified property is a most specific target CSS rule and comprises attributes associated with the modified property;
    enabling property changes to occur in the first target CSS rule when it is determined that the modified property is not set by any of the plurality of target CSS rules; and
    enabling the property changes to occur in the most specific target CSS rule of the plurality of target CSS rules when it is determined that the modified property is set by the most specific target CSS rule.

2. The method of claim 1, wherein selecting the first target rule comprises selecting the first target rule comprising an entire selector list plus a declaration blocking.

3. The method of claim 1, wherein selecting the first target rule comprises selecting the first target rule comprising one of a rule corresponding to an in-line style, a rule corresponding auto classing, and a rule corresponding to semantic auto IDing.

4. The method of claim 1, further comprises providing a highlighting mechanism configured to allow a user to see which regions of a page are to be affected by the next formatting operation.

5. A system for providing direct style sheet editing via a tool bar, the system comprising:
   a memory storage for maintaining a database; and
   a processing unit coupled to the memory storage, wherein the processing unit is operative to:
   select a first target CSS rule for a next formatting operation using a tool bar, the selected first target CSS rule including a modified property and being selected from a plurality of target CSS rules;
   determine if the modified property was previously set by one of the plurality of target CSS rules in response to a user selecting a re-used properties button, wherein the target CSS rule that previously set the modified property is a most specific target CSS rule and comprises attributes associated with the modified property;
   enable property changes to occur in the first target CSS rule when it is determined that the modified property is not set by any of the plurality of target CSS rules;
   enable the property changes to occur in the most specific target CSS rule when it is determined that the modified property is set by the most specific target CSS rule; and
   provide a highlighting mechanism configured to allow a user to see which regions of a page are to be affected by the next formatting operation by placing a polygon around text affected by the next formatting operation.

6. The system of claim 5, wherein the processing unit operative to select the first target rule comprises the processing unit operative to select the first target rule comprising an entire selector list plus a declaration blocking.

7. The system of claim 5, the processing unit operative to select the first target rule comprises the processing unit operative to select the first target rule comprising one of a rule corresponding to an in-line style, a rule corresponding auto classing, and a rule corresponding to semantic auto IDing.

8. A computer-readable storage medium which stores a set of instructions which when executed performs a method for providing direct style sheet editing via a tool bar, the method executed by the set of instructions comprising:
   selecting a first target CSS rule for a next formatting operation using a tool bar, the selected first target CSS rule including a modified property;
   providing, in response to a selection of the first target CSS rule, a drop down menu comprising a plurality of CSS target rules tangent to the first target CSS rule;
   determining if the modified property was previously set by one of the plurality of target CSS rules, wherein the target CSS rule that previously set the modified property is a most specific target CSS rule and comprises attributes associated with the modified property;
   enabling property changes to occur in the first target CSS rule when it is determined that the modified property is not set by any of the plurality of target CSS rules;
   enabling the property changes to occur in the most specific target CSS rule when it is determined that the modified property is set by the most specific target CSS rule.

9. The computer-readable medium of claim 8, wherein providing the drop down menu comprises providing an entire selector list plus a declaration blocking.

10. The computer-readable medium of claim 8, wherein selecting the first target rule comprises selecting the first target rule comprising one of a rule corresponding to an in-line style, a rule corresponding auto classing, and a rule corresponding to semantic auto IDing.

11. The computer-readable medium of claim 8, further comprises providing a highlighting mechanism configured to allow a user to see which regions of a page are to be affected by the next formatting operation.

12. The computer-readable medium of claim 11, wherein providing the highlighting mechanism configured to allow the user to see which regions of the page are to be affected by the next formatting operation comprises providing the highlighting mechanism configured to allow the user to see which regions of the page are to be affected by the next formatting operation by placing a polygon around text affected by the next formatting operation.

13. The method of claim 4, wherein providing the highlighting mechanism configured to allow the user to see which regions of the page are to be affected by the next formatting operation comprises providing the highlighting mechanism configured to allow the user to see which regions of the page are to be affected by the next formatting operation by placing a polygon around text affected by the next formatting operation.

14. The method of claim 1, wherein determining if the modified property is set by any of the plurality of target rules comprises determining if the modified property is set by any of the plurality of target rules in response to a user selecting a re-used properties button.

* * * * *